United States Patent [19]

Herriau et al.

[11] Patent Number: 4,995,325
[45] Date of Patent: Feb. 26, 1991

[54] SETTING WHEELS FOR SEED DRILLS

[75] Inventors: Auguste Herriau, Paris; Paul Herriau, Cambrai, both of France

[73] Assignee: Societe Sogefina, Societe De Gestion Financiere Armoricaine, Paris, France

[21] Appl. No.: 314,217

[22] Filed: Feb. 22, 1989

[30] Foreign Application Priority Data

Mar. 4, 1988 [FR] France ............................. 88 02755

[51] Int. Cl.$^5$ ............................................ A01C 13/00
[52] U.S. Cl. ................................. 111/189; 111/137; 111/197; 111/153
[58] Field of Search ............... 111/85, 87, 88, 189, 111/197, 198, 194–196, 191, 153, 135, 136, 190, 137; 172/538, 158, 154

[56] References Cited

U.S. PATENT DOCUMENTS

| 1,040,041 | 10/1912 | Slomski | 172/158 |
|---|---|---|---|
| 2,332,012 | 10/1943 | Rasmussen . | |
| 2,577,775 | 12/1951 | Lemmon et al. | 111/85 |
| 3,023,717 | 3/1962 | Cline | 111/85 |
| 3,227,226 | 1/1966 | Bayne | 111/197 |
| 3,336,885 | 8/1967 | Lebow | 111/85 |
| 3,533,367 | 10/1970 | Schnermann | 111/85 |
| 4,307,674 | 12/1981 | Jennings et al. | 111/85 |
| 4,408,551 | 10/1983 | Keller et al. | 111/85 |
| 4,598,654 | 7/1986 | Robertson et al. . | |
| 4,760,806 | 8/1988 | Bigbee et al. | 111/87 |

FOREIGN PATENT DOCUMENTS

| 650689 | 9/1937 | Fed. Rep. of Germany | 111/190 |
|---|---|---|---|
| 3122717 | 1/1983 | Fed. Rep. of Germany . | |
| 2257217 | 8/1975 | France . | |
| 2415420 | 8/1979 | France . | |
| 2478942 | 8/1983 | France . | |

Primary Examiner—Danton D. DeMille
Attorney, Agent, or Firm—Young & Thompson

[57] ABSTRACT

A wheel (4) for setting sown seeds, for use in a sowing machine, is rigidly connected in rotation with at least one gauging wheel (5) having a rolling radius smaller than the radius of the periphery of the setting wheel (4). The gauging wheel (5) is a wheel with a deformable peripheral coating, such as a low pressure pneumatic tire (13).

9 Claims, 2 Drawing Sheets

SETTING WHEELS FOR SEED DRILLS

FIELD OF THE INVENTION

Setting wheels are wheels which, in the sowing machine, pack the bottom of the furrow in which seeds have been deposited in order to keep them steady by slightly driving them into the ground, so as to improve the contact between the seeds and the ground and to favour germination, the pressure of the wheel assisting in bringing the moisture up to the surface.

BACKGROUND OF THE INVENTION

Such a setting wheel, used in a so-called precision seed drill, is disclosed in FR-A-No. 2 478 942. In such a sowing machine which ensures the placement of the seeds with a very high precision, it is still more necessary to avoid a displacement of the seed at the moment it is driven in by the setting wheel, due the effect of the sliding speed of the latter. In order to avoid this sliding effect, the hereabove patent proposes to drive the setting wheel in such manner that its peripheral speed is substantially equal to the advancement speed of the sowing machine, and preferably superior by 1 to 2% to said speed. In practice and as proposed in this patent, the setting wheel is rotatably mounted on an axis which is associated in height to the drill coulter which opens the furrow and brings the seeds in the dihedron between the bottom of the furrow and the periphery of said wheel via a channel formed on its rear face and surrounding the lower front periphery of the setting wheel. The wheel is driven in rotation by a transmission device of any known type such as a pinion and chain system from one of the wheels of the sowing machine, in practice the gauging wheel which adjusts the ploughing depth of the coulter of each element, or from the tractor power take-off.

This embodiment has various disadvantages amongst which one can cite the necessity for each setting wheel to use an extra transmission liable to break and to get soiled, and the fact that since the gauging wheel of each element is placed at a distance, in principle rearwardly from the transverse axial line of the setting wheel, the ground irregularities to which the gauging wheel can be faced such as stones, a transverse furrow or a localized ground zone exhibiting an adherence fault have an influence on the depth of the furrow and on the rotation speed of the setting wheel. Moreover, the setting wheels are usually narrow, their width corresponding generally to the width of the furrow and, for preventing the ground from adhering to the periphery and attracting the seeds imbedded in the ground, it is necessary to provide on each wheel a cleaning device which brakes the setting wheel, and this is liable to increase the sliding effect and is remedied by the chain or belt transmission connecting the setting wheel to the gauging wheel which carries the load of the element and therefore is well adhering to the ground.

OBJECTS AND SUMMARY OF THE INVENTION

The present invention aims at remedying these various disadvantages and its object is a setting wheel for a sowing machine, coaxial and rigidly connected in rotation with at least one gauging wheel having a rolling radius smaller than the radius of the setting wheel periphery, characterized in that the gauging wheel is a wheel with a deformable peripheral coating such as a low pressure tyre.

By rolling radius of the gauging wheel is meant the result of a division by 2 of the distance covered necessary for rotating the gauging wheel over quite exactly one turn, the gauging wheel being a wheel with a deformable coating such as a low pressure tyre ensuring the automatic removal of dirt but the rolling radius of which, as hereabove defined, can vary with the inflation pressure.

FR-A-No. 2 257 217 and DE-C-No. 3 122 717 disclose a setting wheel provided with coaxial side cylindrical extensions of smaller diameter, forming the equivalent of a gauging wheel. However, this monolithic assembly does not allow an adaptation to the ground nature or to the presence of obstacles such as stones, so that the setting wheel drives the seeds too deeply in the ground, or on the contrary does not reach them.

Preferably, the gauging wheel rolling radius is inferior by 2 to 15%, and preferably by 10% as an average, to the setting wheel radius.

It would be possible to provide two gauging wheels on either side of the setting wheel, but in practice a single gauging wheel is provided, which is jointed laterally to the setting wheel with its peripheral coating in tight contact with the side surface of the setting wheel so as to avoid water and mud infiltrations between them.

In this preferential embodiment, the setting wheel-gauging wheel assembly leaves behind it a wheel-track including a plane shallow portion in alignment with the gauging wheel and a deeper furrow in alignment with the setting wheel with, beyond the setting wheel furrow, a small ground mound resulting from the ground rejected on either side of the coulter, the one which is on the side of the gauging wheel having been crushed by the latter.

According to another feature of the invention, the setting wheel is associated with a skimmer situated at the opposite of the gauging wheel with respect to the setting wheel, which skimmer pushes back the mound of ground and rejects it in the furrow so as to fill it with a small band of ground bordering said setting wheel furrow.

According to a preferential embodiment, this skimmer formed of an oblique blade the lower edge of which is inclined downwardly in the direction of the neighbouring face of the setting wheel until it reaches it, while extending thereafter above the furrow and behind the gauging wheel by a horizontal portion, is carried by an arm articulated about a transverse axis, preferably the wheel axis and bears via a skid on the ground of the wheel-track left by the gauging wheel. With the skid bearing on the gauging wheel wheel-track which is well levelled, the closing up of the gauging wheel furrow, and therefore the covering of the seeds, is of a constant height.

In special cases of seeds having to be covered with a thickness of ground which is less or more than the difference between the setting wheel radius and the minimum radius resulting from the flattening of the deformable coating of the gauging wheel, it is possible, for obtaining a reduced covering thickness, to provide a skimmer with a lower edge offset downwardly in the region facing the setting wheel furrow, or a skimmer carrying an element which is adjustable in height, which extends into the setting wheel furrow. When the covering thickness has to be more than the furrow depth, one can provide a height setting screw between the skimmer and the skid and possibly provide at the skimmer point a blade forming a coulter in order to take back sideways a volume of ground which is more than the volume of the mound created by the sowing machine coulter.

In order to be able to modify the level difference of the lower generating lines of the two setting and gauging wheels while preserving radii for both wheels corresponding to a peripheral speed of the gauging wheel which is superior by a few percent to the sowing machine advancement speed, according to a preferred embodiment of the invention one can interpose between the setting wheel axis and the gauging wheel axis a device allowing their relative offset, at least in the vertical direction. When the wheels are offset with respect to the coaxial position, the levels of the lower generating lines of both wheels are at levels which are distant from one another by a value corresponding to the radii difference increased of the offset.

A sowing machine is known (see U.S. Pat. No. 2,332,012) in which a furrow formation device is made of two disks inclined one with respect to the other and carrying eccentric gauging wheels so as to set the depth of the furrow. In this document is not used the gauging wheel with a tyre jointed to a setting wheel as is the case of the present invention.

Advantageously, the gauging wheel is mounted with interposition of an eccentric ring around the axis of the gauging wheel. The eccentricity is adjusted by rotating the gauging wheel axis on which is rotatably locked the eccentric ring.

As regards the rotation transmission between the gauging wheel when in an eccentric position and the setting wheel, such a transmission seemed to be a source of problems due to offset of the two axes.

However, the function of the gauging wheel, in the invention, is not to drive the setting wheel at a perfectly defined speed, but to apply to it a torque having a tendency to provide it with an advance with respect to the rotation speed resulting from its rolling in the bottom of a furrow. It has been established surprisingly that when the gauging wheel is provided with a pneumatic tyre maintained against the surface of the setting wheel, the friction forces resultant provides the desired entrainment of the setting wheel. This actuation of the gauging wheel is assisted in addition by the fact that the tyre flattens when in contact with the ground, thereby causing an increase of its width and therefore of the pressure exerted at this location by the gauging wheel tyre against the setting wheel flank. Therefore, the rotation driving torque exerted on the setting wheel by the gauging wheel becomes more important than the resistant torque due to the frictions exerted on the setting wheel periphery.

Consequently, according to another feature of the invention, the gauging wheel is maintained in a sliding friction contact, by a large circle of its lateral face, with the adjacent plane lateral surface of the setting wheel.

In order to obtain a positive drive between the gauging wheel and the setting wheel, it would be possible to use a gear train which would be necessarily complex due to the offset and the practical mounting of which would be the cause of insoluble problems. In order to avoid this gear train while ensuring a drive preventing a sliding motion between setting wheel and gauging wheel exceeding a few degrees, it is possible to use a drive of the squirrel cage type, with spokes having a constant angular spacing and extending radially from the gauging wheel hub and engaging between studs having the same angular spacing than the gauging wheel spokes, carried by the adjacent lateral surface of the setting wheel.

The almost perfect tightness reached by the fact that the tyre bears against the setting wheel, in addition to the hereabove mentioned automatic cleaning effect, prevents the earth from penetrating inside and blocking the system. Moreover, the tyre sweeps, in the manner of windscreen wiper, the setting wheel side face which is therefore always perfectly smooth, this being a critical condition, for the correct operation of the system since, if the resistance due to the sliding motion is too high, the assembly does not operate.

In the case of the invention variant in which the gauging wheel can be offset with respect to the setting wheel, one can provide that the offset according to the horizontal of the gauging wheel with respect to the setting wheel is such that the distance between the setting wheel periphery and the gauging wheel periphery is greater at the rear, or at the minimum equal, than that in front in the advancement direction of the machine.

BRIEF DESCRIPTION OF DRAWINGS

The invention will be described in more detail hereafter with reference to the accompanying drawings depicting schematically an embodiment of a sowing machine element including a setting wheel according to the invention, and wherein.

DETAILED DESCRIPTION OF THE INVENTION

Figure 1:
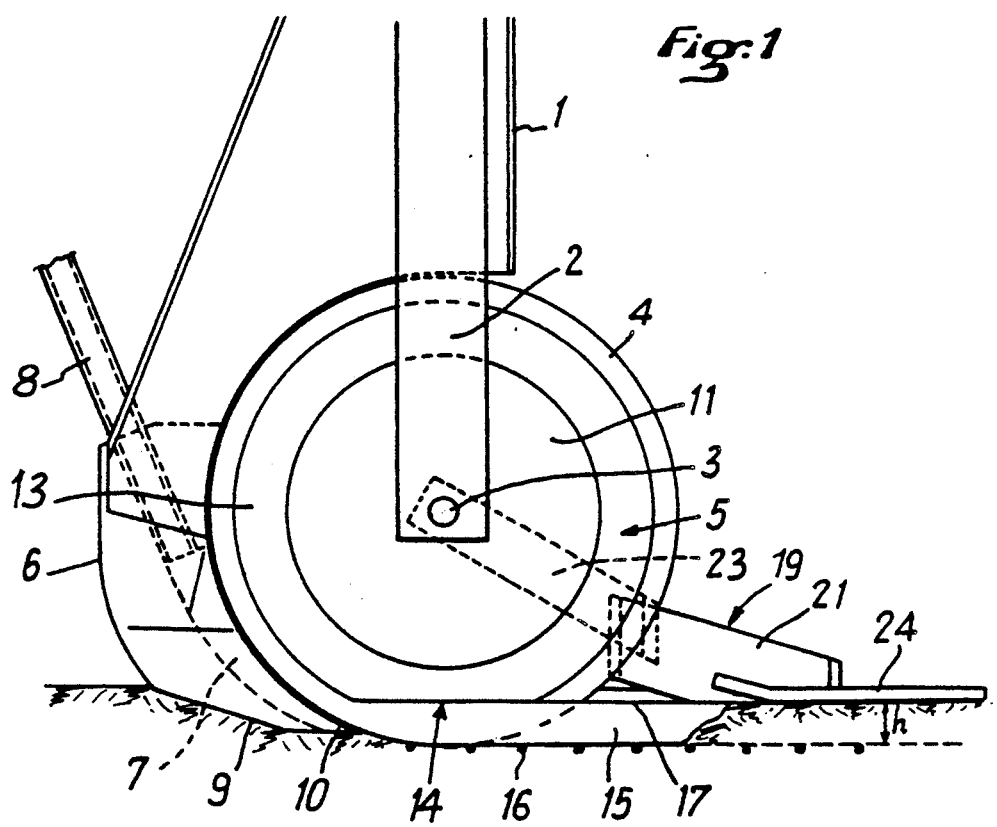
FIG. 1 is a side elevation view of the sowing machine element.
Figure 2:
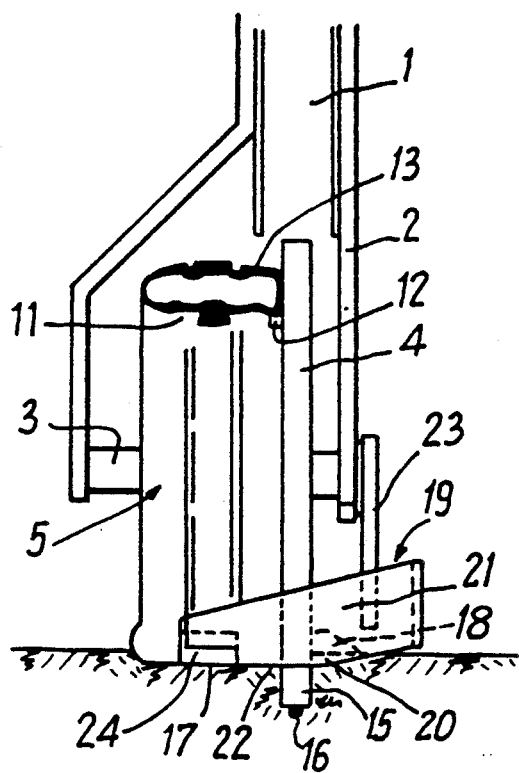
FIG. 2 is a rear elevation of FIG. 1, showing the gauging wheel partly in section.
Figure 3:
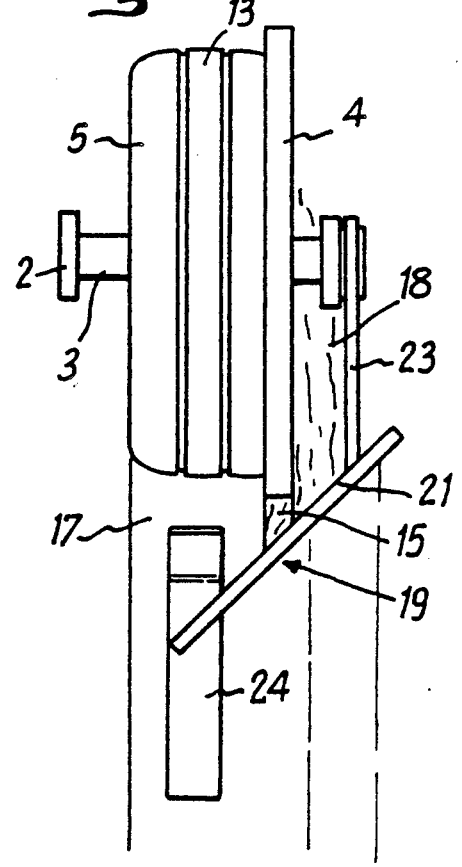
FIG. 3 is a top plan view thereof.

In FIGS. 1 to 3, reference 1 denotes the element frame, and reference 2 the fork carrying via an axis 3 the setting wheel 4 to which is jointed, according to the invention, the gauging wheel 5 which will be described in more detail hereafter, the direction of advancement being from the right to the left in FIG. 1.

Reference 6 denotes the coulter which is of the type which is the object of FR-A-No. 2 478 942, meaning that the rear portion of coulter 6 is applied on the lower front peripheral portion of setting wheel 4 and that in the surface of this rear portion of the coulter is formed a groove 7 constituting the end portion of the pneumatic channel 8 for bringing the seeds in the bottom of furrow 9 opened by the coulter, inside the dihedron 10 between the furrow bottom and the setting wheel.

The setting wheel 4 is a wheel with a rigid peripheral surface. In practice, it is made of a metallic disk the thickness of which is equal to the width of the rear face of coulter 6. The gauging wheel 5 the rim 11 of which is keyed onto shaft 3, with its lower bead 12 tightly jointed to the side surface of setting wheel 4, is surrounded by a low pressure pneumatic tyre 13. The nominal radius of the low pressure pneumatic tyre 13 is equal to about 9/10th of the radius of setting wheel 4, which fixes substantially the rolling radius of gauging wheel 5 to somewhat less than 90% of the setting wheel 4 radius. The inflation pressure of tyre 13 allows modifying the amount of flattening 14 of the tyre, and therefore the depth coulter 6 is driven into the ground, the depth of furrow 9 and the level of the lower generating line of the setting wheel 4.

As is visible in FIG. 2, the passage of the seed drill element including coulter 6, setting wheel 4 and gauging wheel 5, leaves a wheel-track comprising a furrow 15 in the bottom of which the seeds 16 are driven in, with, behind the gauging wheel, a plane compacted surface 17 and on the opposite side a ground mound 18 rejected sideways by coulter 6. According to the invention, the planeity of wheel-track 17 of gauging wheel 5 is used for guiding heightwise a skimmer denoted generally by reference 19 for covering the seeds 16 by filling furrow 15 with the ground of mound 18 and with the ground of a small band 20 bordering furrow 15. Skimmer 19 can be replaced by an equivalent raking device such as a vertical spring or a flexible rod.

The skimmer 19 includes an oblique blade 21 the lower edge 22 of which, in the embodiment shown by way of example, is inclined downwardly in its front portion in order to come in front of the neighbouring lateral face of the setting wheel 4, then extends rearwardly, above furrow 19 and the neighbouring portion of the wheel-track 17, by a horizontal portion. Skimmer 19 is articulated by an arm 23 about axis 3 and it bears at its rear end on the levelled ground of the wheel-track 17 via a skid 24. Thus is obtained an accurate refilling of furrow 15 by a covering of seeds 17 having height h which is perfectly constant. It is obvious that by providing the lower edge 22 of the skimmer blade 21 with another profile, one may modify the transverse wheel-track profile after the passage of the skimmer in order to modify the seed covering height h with always the same constance of its height due to the planeity of wheel-track 17 of gauging wheel 5.

Figure 4:
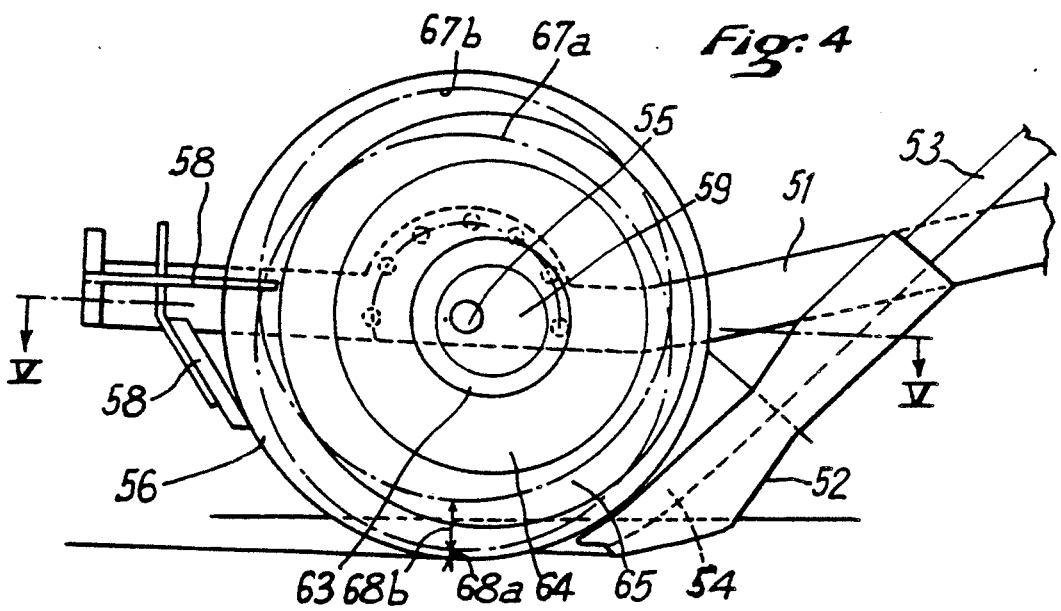
FIG. 4 is a side elevation view of the sowing machine at the level of the setting wheel according to a variant of the invention.
Figure 5:
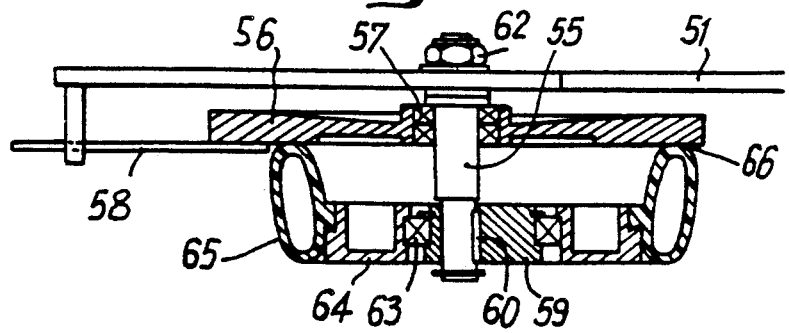
FIG. 5 is a sectional view by V—V of FIG. 4, limited to the gauging wheel and setting wheel.
Figure 6:
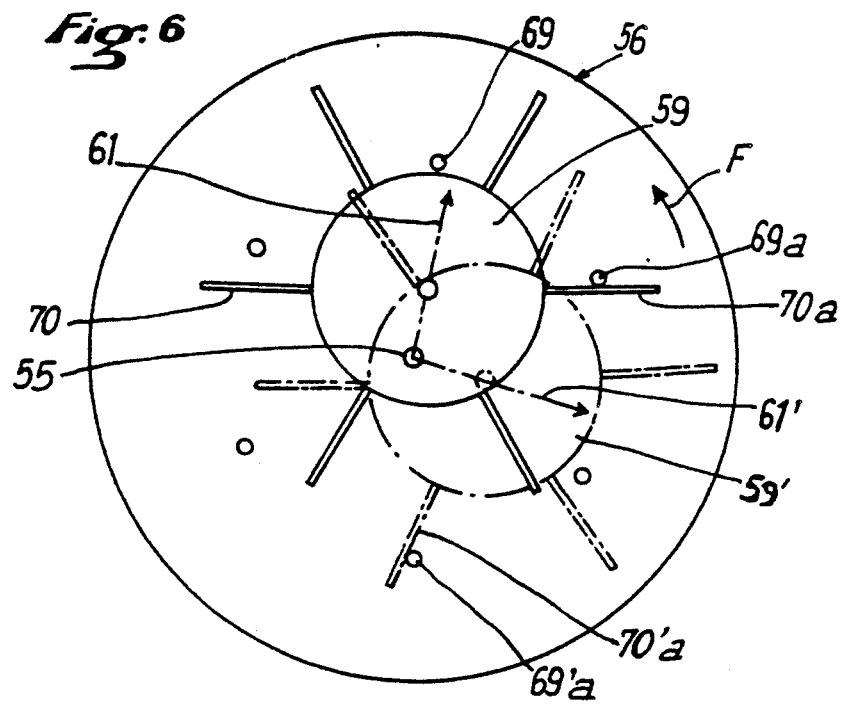
FIG. 6 is a schematic representation explaining the positive drive mechanism of the setting wheel by the offset gauging wheel of FIGS. 4 and 5.

Reference is now made to FIGS. 4 to 6 showing an alternative embodiment of the invention. In these figures, reference 51 denotes the frame of the seed drill, reference 52 the coulter which opens a furrow in the ground, reference 53 a pneumatic inlet pipe for the seeds in the furrow bottom, reference 54 denoting the portion of the seed inlet pneumatic channel surrounding the front lower periphery of the wheel. In FIG. 4, the direction of advancement is from the left to the right.

Reference 55 designates the axis of setting wheel 56 rotatably mounted via bearings 57. With the setting wheel 56 cooperate in known manner cleaning devices 58 the effect of which creates a resistant friction torque which has a tendency to cause a sliding of the setting wheel with respect to the furrow bottom, the object of the invention being to avoid this sliding effect.

On the axis 55 of the setting wheel is mounted an eccentric 59 keyed at 60 on said axis. In order to set the offset direction, that is the orientation of axis 61 joining the centers, one unscrews nut 62 blocking the axis of wheel 55 on frame 51, one sets this orientation and one retightens nut 62.

At the periphery of eccentric 59 is rotatably mounted via rollers 63 the gauging wheel 64 covered with a pneumatic tyre 65. Pneumatic tyre 65 is bearing under pressure on the great circle 66 against the lateral face of setting wheel 56, this pressure being maximum at the level of the ground due to the flattening of pneumatic tyre 65.

In FIG. 4, the circles in chain-dot lines 67a and 67b show the two maximum offset positions according to the vertical of gauging wheel 54 with respect to setting wheel 56, these two positions corresponding to the furrow depths 68a and 68b. One will note that the offset according to the horizontal of gauging wheel 64, 65 is such, as is particularly visible in FIG. 5, that the distance between the periphery of setting wheel 56 and the periphery of gauging wheel 64-65 is greater in front than in the rear. This allows pushing back the earth while the earth would have a tendency to be brought back inside the system, particularly when the earth is sticky, if the relative disposition was reversed.

The torque transmitted by friction along the line of contact 66 by gauging wheel 64 to setting wheel 56 has proved to be sufficient in practice for surmounting the resisting couples exerted on the latter, and to avoid any sliding effect.

However, it is possible as shown in FIG. 6 to provide a positive drive of setting wheel 56 from gauging wheel 64-65, irrespective of the offset of the two wheels, by mounting on the flank of setting wheel 56 which is facing gauging wheel 64 protruding pins 69 angularly distributed and for example spaced apart by 60°, and to provide the opposed face of the gauging wheel with spokes 70 adapted for coming to bear behind pins 69. As shown in FIG. 6 for two offset directions 61-61' of eccentric 59-59', one of spokes 70a, 70'a comes in abutment behind pin 69a-69' a situated in front according to the rotation F of the wheels and ensures eventually the entrainment of said pin and of the setting wheel over a sector of about 60°.

We claim:

1. A setting wheel assembly for use in a sowing machine, said assembly comprising a setting wheel having a peripheral portion adapted to urge sown seeds more deeply into a furrow, and a gauging wheel attached to one side of said setting wheel, said gauging wheel having a rolling radius smaller than the radius of said peripheral portion of the setting wheel, wherein said gauging wheel comprises a resiliently deformable ground-engaging surface, said resiliently deformable ground-engaging surface being a low pressure pneumatic tire, said assembly further comprising a common axle on which said setting wheel and said gauging wheel are independently rotatably mounted, said gauging wheel exerting a tractive force on said setting wheel solely by frictional contact of said ground-engaging surface on said one side of said setting wheel.

2. The setting wheel assembly according to claim 1, wherein said gauging wheel has a rolling radius of about 2 to about 15% less than the radius of said setting wheel.

3. The setting wheel assembly according to claim 2, wherein said gauging wheel has a rolling radius about 10% less than that of said setting wheel.

4. The setting wheel assembly according to claim 1, further comprising a raking device attached to said setting wheel on the side opposite said gauging wheel, said raking device being adapted to fill a furrow, after passage of said setting wheel in the furrow, with dirt removed from the furrow by an upstream coulter, along with a small strip of dirt adjacent the furrow, excavated by the raking device.

5. The setting wheel assembly according to claim 4, wherein said raking device comprises an oblique blade extending transversely behind said setting wheel, said blade having a first end on the said opposite side of said setting wheel and a second end on said one side of said setting wheel, said oblique blade having a lower edge which is downwardly inclined from said first end to said second end, said second end of said oblique blade comprising a horizontal portion adapted to trail said gauging wheel, said raking device further comprising an arm connecting said raking device to said opposite side of said setting wheel, for pivotal movement about a transverse axis.

6. The setting wheel assembly according to claim 1, further comprising means interconnecting said setting wheel and said gauging wheel, said interconnecting means permitting adjustment of the position of the gauging wheel relative to the setting wheel, in a direction perpendicular to the axes of rotation of the gauging wheel and setting wheel.

7. The setting wheel assembly according to claim 6, wherein said interconnecting means comprises a ring defining the axis of rotation of said gauging wheel, said ring being mounted eccentrically on the axis of rotation of said setting wheel, and being pivotable about the axis of said setting wheel to a plurality of locking positions.

8. The setting wheel assembly according to claim 6, further comprising a common axle on which said setting wheel and said gauging wheel are independently rotatably mounted, said gauging wheel exerting a tractive force on said setting wheel solely by frictional contact on said ground-engaging surface on said one side of said setting wheel.

9. A setting wheel assembly for use in a sowing machine, said assembly comprising a setting wheel having a peripheral portion adapted to urge sown seeds more deeply into a furrow, and a gauging wheel attached to one side of said setting wheel, said gauging wheel having a rolling radius smaller than the radius of said peripheral portion of the setting wheel, wherein said gauging wheel comprises a resiliently deformable ground-engaging surface, said assembly further comprising means interconnecting said setting wheel and said gauging wheel, said interconnecting means permitting adjustment of the position of the gauging wheel relative to the setting wheel, in a direction perpendicular to the axes of rotation of the gauging wheel and setting wheel, said assembly further comprising a cooperating drive means whereby said setting wheel is driven in rotation by said gauging wheel, said cooperating drive means comprising a plurality of radially extending spokes arranged circumferentially on the inner face of said gauging wheel, said spokes cooperating with a plurality of circumferentially spaced pins projecting from said one side of said setting wheel toward said gauging wheel, said pins and spokes being so arranged and dimensioned as to promote a driving engagement between said gauging wheel and said setting wheel throughout the range of relative movement therebetween.

* * * * *